United States Patent
Lee et al.

(10) Patent No.: US 8,645,527 B1
(45) Date of Patent: Feb. 4, 2014

(54) NETWORK MONITORING USING BOUNDED MEMORY DATA STRUCTURES

(75) Inventors: Rosanna Lee, Palo Alto, CA (US); Xiaohong Pan, Fremont, CA (US); Rangaswamy Jagannathan, Sunnyvale, CA (US); Derek Sanders, Saratoga, CA (US); Kishor Kakatkar, Kothrud (IN)

(73) Assignee: Xangati, Inc., Cupertino, CA (US)

( * ) Notice: Subject to any disclaimer, the term of this patent is extended or adjusted under 35 U.S.C. 154(b) by 254 days.

(21) Appl. No.: 12/180,333

(22) Filed: Jul. 25, 2008

Related U.S. Application Data

(60) Provisional application No. 60/962,295, filed on Jul. 25, 2007, provisional application No. 60/962,181, filed on Jul. 25, 2007, provisional application No. 60/962,182, filed on Jul. 25, 2007.

(51) Int. Cl.
*G06F 15/16* (2006.01)
*G06F 15/173* (2006.01)
*G06F 3/00* (2006.01)

(52) U.S. Cl.
USPC .......... 709/224; 709/201; 709/205; 709/245; 709/246; 710/29

(58) Field of Classification Search
USPC .......................... 709/201, 205, 224, 245, 246
See application file for complete search history.

(56) References Cited

U.S. PATENT DOCUMENTS

| | | |
|---|---|---|
| 5,128,871 A | 7/1992 | Schmitz |
| 5,233,604 A | 8/1993 | Ahmadi et al. |
| 5,271,038 A | 12/1993 | Cai |
| 5,430,709 A | 7/1995 | Galloway |
| 5,442,750 A | 8/1995 | Harriman et al. |
| 5,917,870 A | 6/1999 | Wolf |
| 5,958,053 A | 9/1999 | Denker |
| 5,970,064 A | 10/1999 | Clark et al. |
| 5,991,881 A | 11/1999 | Conklin et al. |
| 6,046,979 A | 4/2000 | Bauman |
| 6,076,115 A | 6/2000 | Sambamurthy et al. |
| 6,115,745 A | 9/2000 | Berstis et al. |
| 6,167,025 A | 12/2000 | Hsing et al. |
| 6,189,035 B1 | 2/2001 | Lockhart et al. |
| 6,202,084 B1 | 3/2001 | Kumar et al. |
| 6,314,093 B1 | 11/2001 | Mann et al. |

(Continued)

OTHER PUBLICATIONS

Deering et al. "RFC1883," Internet Protocol Specification, Dec. 1995, pp. 1-27, ver. 6, <http://www.faqs.org/rfcs/rfc1883.html>.

(Continued)

*Primary Examiner* — Ranodhi Serrao
*Assistant Examiner* — Farrukh Hussain
(74) *Attorney, Agent, or Firm* — Dorsey & Whitney LLP

(57) ABSTRACT

A network monitoring device includes a data structure for maintaining information about endpoints involved in network flows. Each endpoint, either a source or a destination for a network flow, has information maintained in a modified binary trie, having a branch for each bit of the source or destination address, but with interior nodes having only a single child node elided. A pruning thread is given a limited amount of time for operation, with the effect that the data structure is maintained available for use except for only that limited amount of time. In the event that the pruning thread is unable to prune the entire data structure, it maintains a marker indicating where last it left off, and returns to that location in the data structure at a later pruning operation.

33 Claims, 4 Drawing Sheets

(56) References Cited

U.S. PATENT DOCUMENTS

| | | | |
|---|---|---|---|
| 6,314,464 B1 | 11/2001 | Murata et al. | |
| 6,347,339 B1 | 2/2002 | Morris et al. | |
| 6,502,135 B1 | 12/2002 | Minger et al. | |
| 6,529,866 B1 | 3/2003 | Cope et al. | |
| 6,725,377 B1 | 4/2004 | Kouznetsov | |
| 6,757,742 B1 | 6/2004 | Viswanath | |
| 6,785,237 B1 | 8/2004 | Sufleta | |
| 6,789,190 B1 | 9/2004 | Cohen | |
| 6,816,910 B1 | 11/2004 | Riciulli | |
| 6,930,978 B2 | 8/2005 | Sharp et al. | |
| 6,973,040 B1 | 12/2005 | Ricciulli | |
| 6,990,591 B1 | 1/2006 | Pearson | |
| 7,007,301 B2 | 2/2006 | Crosbie et al. | |
| 7,013,482 B1 | 3/2006 | Krumel | |
| 7,051,369 B1 | 5/2006 | Baba | |
| 7,062,782 B1 | 6/2006 | Stone et al. | |
| 7,076,547 B1 | 7/2006 | Black | |
| 7,089,428 B2 | 8/2006 | Farley et al. | |
| 7,260,840 B2 | 8/2007 | Swander et al. | |
| 7,331,060 B1 | 2/2008 | Ricciulli | |
| 7,386,888 B2 | 6/2008 | Liang et al. | |
| 7,409,714 B2 | 8/2008 | Gupta et al. | |
| 7,461,403 B1 | 12/2008 | Libenzi et al. | |
| 7,506,046 B2 | 3/2009 | Rhodes | |
| 7,594,260 B2 | 9/2009 | Porras et al. | |
| 7,620,986 B1 | 11/2009 | Jagannathan et al. | |
| 7,702,563 B2 | 4/2010 | Balson et al. | |
| 2001/0049711 A1 | 12/2001 | Nishihara | |
| 2002/0052967 A1 | 5/2002 | Goldhor et al. | |
| 2002/0131413 A1* | 9/2002 | Tsao et al. | 370/392 |
| 2002/0164999 A1* | 11/2002 | Johnson | 455/456 |
| 2003/0229485 A1 | 12/2003 | Nishikawa et al. | |
| 2003/0229692 A1 | 12/2003 | Vo | |
| 2004/0054925 A1 | 3/2004 | Etheridge et al. | |
| 2005/0171960 A1* | 8/2005 | Lomet | 707/100 |
| 2005/0190695 A1 | 9/2005 | Phaal et al. | |
| 2005/0213504 A1 | 9/2005 | Enomoto | |
| 2005/0276230 A1 | 12/2005 | Akahane et al. | |
| 2005/0278779 A1 | 12/2005 | Koppol et al. | |
| 2006/0059282 A1* | 3/2006 | Chaudhary et al. | 710/100 |
| 2006/0077905 A1 | 4/2006 | Russell et al. | |
| 2006/0109793 A1 | 5/2006 | Kim et al. | |
| 2006/0195896 A1* | 8/2006 | Fulp et al. | 726/11 |
| 2006/0272018 A1 | 11/2006 | Fouant | |
| 2007/0156919 A1* | 7/2007 | Potti et al. | 709/238 |
| 2007/0195787 A1 | 8/2007 | Alnuweiri et al. | |
| 2007/0211697 A1 | 9/2007 | Noble | |
| 2008/0291915 A1 | 11/2008 | Foschiano | |
| 2009/0046664 A1 | 2/2009 | Aso | |
| 2010/0135180 A1 | 6/2010 | Morinaga et al. | |
| 2011/0040706 A1 | 2/2011 | Sen et al. | |

OTHER PUBLICATIONS

Steinke. "IP Addresses and Subnet Masks," Network Magazine, Oct. 1995, pp. 1-3, Tables 1 and 3, <http://www.networkmagazine.com/shared/printableArticle.jhtml?articleID=17601068>.

* cited by examiner

| Ranking | Frequency | Term |
|---|---|---|
| 1 | 0 | constant |
| 2 | 28 | daily |
| 3 | 4 | weekly |
| 4 | 56 | |
| 5 | 8 | |
| 6 | 32 | |
| 7 | 1 | |
| 8 | 24 | |

Figure 4

NETWORK MONITORING USING BOUNDED MEMORY DATA STRUCTURES

CROSS-REFERENCE TO RELATED DOCUMENTS

This application claims priority of, the following related documents:
- U.S. Patent Application 60/962,182, filed Jul. 25, 2007 in the name of the same inventors, titled "Network Monitoring Using Bounded Memory Data Structures".
- U.S. Patent Application 60/962,181, filed Jul. 25, 2007 in the name of the same inventors, titled "Parallel Distributed Network Monitoring".
- U.S. Patent Application 60/962,295, filed Jul. 25, 2007 in the name of the same inventors, titled "Network Monitoring Using Virtual Packets".

Each of these documents is hereby incorporated by reference as if fully set forth herein.

BACKGROUND

Large scale network operations often experience technical malfunctions that degrade system performance. For large networks, this degradation can be difficult to isolate because the problem can be located on remote devices or because the problem manifests itself not as a complete failure, but merely as poor performance. Often, isolating a poor performing component is substantially more difficult than isolating one that has completely malfunctioned. To solve network operation problems, network operators use fault management tools that explore and monitor key aspects of a network.

In traditional fault management the mean time to repair (MTTR) a problem is typically a couple of hours. Given the difficulty with both identifying whether an application is degrading and what the source of the degradation is, the MTTR that is associated with application management can be quite lengthy. In many cases, the MTTR associated with first identifying that an application performance exists, and then identifying the source of that problem, is measured in days or weeks.

The problems encountered range in scope and complexity depending on the source of the problems. Some examples of network operations problems include sluggish mission-critical applications, the misuse of peer-to-peer applications, an underutilized load balance link, or lethargic intranet performance—all which have an adverse effect on network operations and eventually to on organization's productivity. Consequently the scope and complexity of monitoring networks with a wide variety of applications, processes, and distribution points is growing and manufacturers of tools for maintaining network operations struggle to stay up-to-date.

One known problem is when monitoring network traffic for a relatively large network, the amount of information relating to that network traffic can also be relatively large. The sheer volume of nodes and traffic in the network makes it more difficult for a network monitoring device to keep up with that relatively large amount of information. Fault isolation often requires tracking and storage of large amounts of data from network traffic reporting devices and routers. Tracking large amounts of data from large networks consumes large amounts of memory and processing time that can hamper system performance. As such what is needed are systems and methods for efficiently storing and processing data for network monitoring.

SUMMARY OF THE DESCRIPTION

A network monitoring device includes a data structure for maintaining information about endpoints involved in network flows. Each endpoint, either a source for a network flow or a destination for a network flow, has information about its network activity maintained in a modified binary trie. The modified binary trie has a branch for each bit of the source or destination address, but with interior nodes having only a single child node elided.

In one embodiment, the data structure is pruned from time to time, with the effect that leaves whose data is no longer relevant are removed. A pruning thread is given a limited amount of time for operation, with the effect that the data structure is maintained available for use except for only that limited amount of time. In the event that the pruning thread is unable to prune the entire data structure, it maintains a marker indicating where last it left off, and returns to that location in the data structure at a later pruning operation.

BRIEF DESCRIPTION OF THE DRAWINGS

FIG. 4 shows a frequency table.

DESCRIPTION

Nature of the Description

Read this application in its most general form. This includes, without limitation:
  References to specific structures or techniques include alternative or more general structures or techniques, especially when discussing aspects of the invention, or how the invention might be made or used.
  References to "preferred" structures or techniques generally mean that the inventor contemplates using those structures are techniques, and think they are best for the intended application. This does not exclude other structures or techniques for the invention, and does not mean that the preferred structures or techniques would necessarily be preferred in all circumstances.
  References to first contemplated causes or effects for some implementations do not preclude other causes or effects that might occur in other implementations, even if completely contrary, where circumstances would indicate that the first contemplated causes or effects would not be as determinative of the structures or techniques to be selected for actual use.
  References to first reasons for using particular structures or techniques do not preclude other reasons or other structures or techniques, even if completely contrary, where circumstances would indicate that the first structures or techniques are not as compelling. The invention includes those other reasons or other structures or techniques, especially where circumstances would indicate they would achieve the same effect or purpose as the first reasons, structures, or techniques.

Terms and Phrases

Read this application with the following terms and phrases in their most general form. The general meaning of each of these terms or phrases is illustrative, not in any way limiting.
  The phrase "network monitoring system" generally refers to any apparatus or method by which information relating to network traffic is identified or reported.
  The phrase "network monitoring device" generally refers to any apparatus included in a network monitoring system.

The phrase "network traffic" generally refers to any information relating to communication in a network of processing devices.

The term "symptoms" generally refers to any information relating to activity of a network of processing devices.

The term "problems" generally refers to any information relating to actual or suspected conditions or status of a network of processing devices.

The phrase "source address" generally refers to information describing the source of a communication in a network processing devices. The phrase "destination address" generally refers to destination of a communication in a network processing devices.

The term "crosspoint" generally describes an entity which can be determined by training, creating a baseline, and eventually detecting symptoms. Five types of crosspoints are generally profiled: IDs (named network endpoints), Applications, Locations, Interfaces and Time Periods.

Figures and Text

FIG. 1

Figure 1:
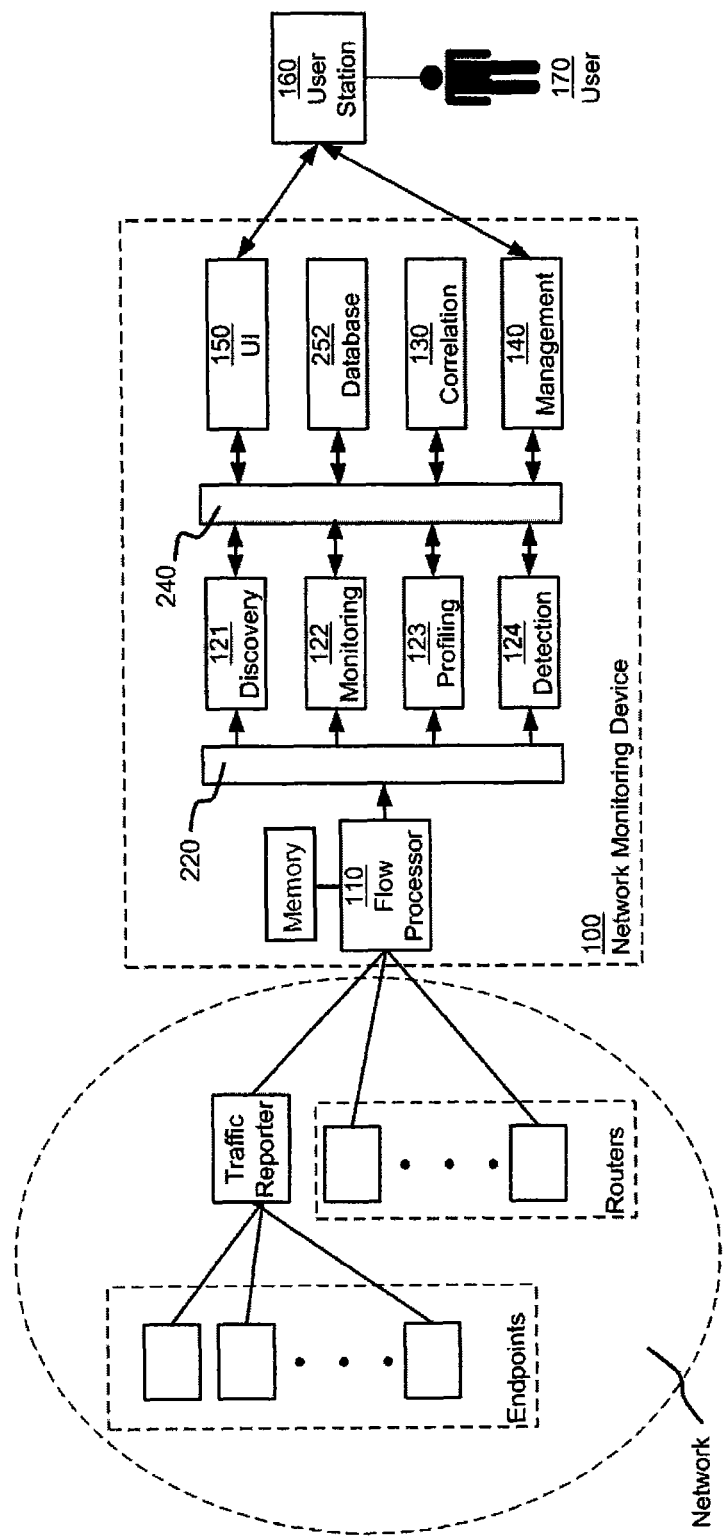
FIG. 1 shows a block diagram of a system.

A FIG. 1 shows a block diagram of a system.

One embodiment of a network monitoring device 100 includes elements as shown in the FIG. 1, including at least: a flow processing engine 110, a discovery engine 121, a monitoring engine 122, a profiling engine 123, a detection engine 124, a correlation engine 130, a management engine 140, and a UI server 150. The UI server 150 is capable of coupling to a user station 160, the latter under control of a user 170.

A communication network being monitored by the network monitoring device 100 might include any form of communication pathway, such as for example, a broadcast or narrowcast network, a bus or crossbar switch or other substantially internal communications path in a computing device, a LAN or WAN, a set of external devices disposed for cluster computing or other distributed computing, an enterprise network or internet or intranet, or otherwise.

The communication network may be coupled to the network monitoring device 100 through a series of routers, traffic reporting devices or other means to monitor information from and between a series of endpoint devices. Endpoints in the system are generally identified by an Internet Protocol (IP) address unique to the device.

Source and destination devices in the communication network might include any form of processing or storage device capable of sending or receiving information using that communication network. In one embodiment, those source and destination devices include at least the capability for sending or receiving messages, also sometimes called "packets", using that communication network. In one embodiment, each packet includes at least a source address, a source port identifier, a destination address, a destination port identifier, and payload information.

Devices that report flow information might include any form of device capable of identifying network traffic and generating information regarding that network traffic. In one embodiment, those reporting devices include routing devices, also capable of sending and receiving messages to and from the source and destination devices and other routing devices, which collect flow information regarding network "flows" and report that flow information according to known flow information reporting protocols.

The flow processing engine 110 preferably includes any form of processing device capable of receiving flow information. Upon receiving a message including flow information in the communication network, the flow processing engine 110 parses that flow information, determines a start time and an end time for that flow information, and determines a number of packets reported by that flow information. The flow processing engine 110 generates a sequence of virtual packets, each representing one or more real packets, but differing from real packets in that (1) virtual packets do not include any payload information, and (2) virtual packets are generated to be equally distributed over the time reported for the flow information, rather than the possible unequal distribution that real packets might have manifested.

The flow processing engine 110 preferably assures that virtual packets are properly ordered with respect to their (generated) arrival time. As the flow processing engine 110 receives flow information, it continues to generate new virtual packets and to maintain those new virtual packets so that all virtual packets remain in time order. Virtual packets older than a selected time duration (in a preferred embodiment, 60 seconds) are forwarded from the flow processing engine 110 to the discovery engine 121, the monitoring engine 122, the profiling engine 123, and the detection engine 124.

The discovery engine 121 preferably reads virtual packets, and generates discovery information relating to identification of devices sending or receiving messages in the communication network, and of the applications they use.

The monitoring engine 122 preferably receives discovery information from the discovery engine 121, reads virtual packets, and generates monitoring information relating to activity of devices sending or receiving messages in the communication network, and the applications they use.

The profiling engine 123 preferably receives monitoring information from the monitoring engine 122, reads virtual packets, and generates profiling information relating to activity of devices sending or receiving messages in the communication network, and the applications they use. Through the profiling engine 123, each network monitoring device 100 maintains locally the profiling information and historical traffic data for all of the endpoints associated with its address blocks. Profiling, monitoring, and detection are done locally at the network monitoring device 100.

The detection engine 124 preferably receives profiling information from the profiling engine 123, and generates symptom information relating to activity of devices sending or receiving messages in the communication network, and the applications they use.

The correlation engine 130 preferably receives symptom information from the detection engine 124, and generates problem information, relating to problems affecting the communication network.

The management engine 140 preferably receives monitoring information from the monitoring engine 122, symptom information from the detection engine 124, and problem information from the correlation engine 130, and makes all that information available to the UI server 150 for presentation to one or more users 170.

The UI server 150 preferably receives information from the management engine 140, and generates a set of information for presentation to users 170 using their user stations 160 as clients in a client-server interactive system. The UI server 150 performs the role of a server in a client-server interactive system, receiving requests from, and making responses to, user stations 160, with the effect that users 170 might use their user stations 160 as clients to receive status information and present commands to the UI server 150.

The user station 160 might include any form of device capable of communicating with a user interface server (as described above) and under control of one or more users 170.

The network monitoring device 100 may be coupled to other similar network monitoring devices with the effect that flow information might be transferred between them. Similarly, storage and processing of flow information may be distributed. In one embodiment a first network monitoring device 100 may be assigned to a first subset of locations on a network, while a second network monitoring device 100 is assigned to monitor a second subset of locations. A series of network monitoring devices 100 would be expandable for monitoring larger scale networks.

FIG. 2

Figure 2:
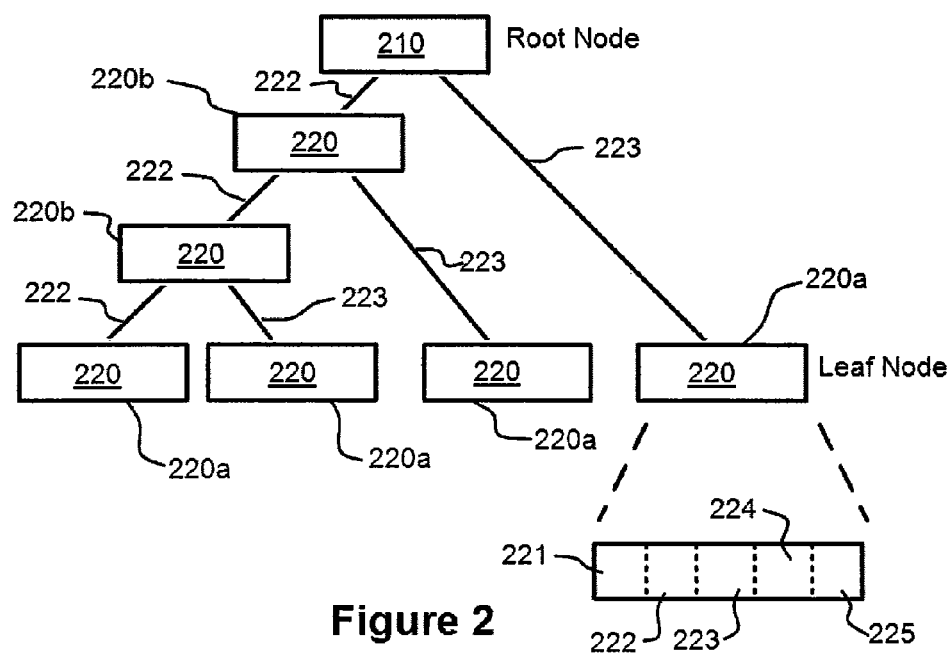
FIG. 2 shows a diagram of a data structure.

A FIG. 2 shows a diagram of a data structure.

One embodiment of a data structure 200 includes elements as shown in the FIG. 2, including at least: a root node 210 and a set of child nodes 220. Each child node 220 includes either a leaf node 220a or an intermediate node 220b having two child nodes itself.

Each child node 220 preferably includes a height value 221, a left pointer 222, a right pointer 223, an address value 224, and a data pointer 225.

The height value 221 preferably indicates how many address bits remain unfilled, that is, the root node would have a height value of 32, a leaf node 220a for a fully specified 32-bit address would have a height value of zero, and an intermediate node 220b specifying all but eight bits of address would have a height value of eight. One having skill in the art will recognize that this structure may be modified to accommodate different bit values. For example, newer versions of IP addresses calling for 128 bit addresses.

The left pointer 222 preferably references a child node 220 for a logical "0" next bit in the address, while the right pointer 223 references a child node 220 for a logical "1" next bit in the address. In the data structure 200, intermediate nodes 220b having only one child node 220 are elided, with the effect that if the next child node 220 has its next bits as logical "1001 . . . " (or other values beginning with logical "1"), that child node 220 will be referenced by the right pointer 223, but if the next child node 220 has its next bits as logical "0011 . . . " (or other values beginning with logical "0"), that child node 220 will be referenced by the left pointer 222.

The address value 224 preferably indicates the actual address value, as far as specified, indicated by that child node 220. If the child node 220 is a leaf node 220a, the address value 224 will indicate the entire address value, while if the child node 220 is an intermediate node 220b, the address value 224 will indicate the address value specified up to the number of bits remaining indicated by the height value 221. This has the effect that leaf nodes 220a will have a height value 221 of zero.

The data pointer 225 preferably references a data structure indicating network information about that particular address, whether that address is a source address or a destination address. Only leaf nodes 220a will have data pointers 225 that reference network information.

Pruning Operation

The data structure 200 preferably is pruned from time to time, with the effect that leaves whose data is no longer relevant are removed.

The network monitoring device 100 preferably includes a pruning thread that is invoked from time to time. The pruning thread is given only a limited amount of time to run, with the effect that the data structure is maintained available for use except for only that limited amount of time.

In a preferred embodiment, the network monitoring device 100 conducts an instrumentation operation to determine how quickly its processing operates, with the effect of determining how much pruning can be conducted within a limited period of time. The network monitoring device 100 directs the pruning thread to run without interruption for that period of time (preferably about 50 milliseconds), after which the pruning thread halts of its own volition. In one embodiment, the pruning thread determines if it has freed enough memory by the time it has completed that limited period of time; if not, it extends the limited period of time for a longer time (preferably about 200 milliseconds).

In the event that the pruning thread is unable to prune the entire data structure, it preferably maintains a marker indicating where last it left off, and returns to that location in the data structure at a later pruning operation.

Examples of Specific Applications

The following examples of specific applications illustrate some aspects of the techniques previously discussed in conjunction with other techniques. It should be understood that this application is not limited to these specific examples. Also, the steps of any methods and/or techniques described below can be performed in a different order than shown, pipelined, threaded, or in other ways. Some steps might be omitted in some applications, and additional steps may be added.

Crosspoints

The term "crosspoint" generally describes an entity which can be determined by training, creating a baseline, and eventually detecting symptoms. Four types of crosspoints are generally profiled: IDs (named network endpoints), Applications, Locations, Interfaces, and Time Periods. Both incoming and outgoing activity for each of these crosspoints may be profiled.

ID and Application crosspoints may be automatically generated using a discovery process, followed by an object creation process. The discovery process looks at flows representing packets on the network. From each flow, it extracts information corresponding to some of the original packet header information for each packet (src/dst IP address, port, and protocol), and creates a virtual packet with that information.

To generate potential ID crosspoints, the discovery process preferably keeps an exponential moving average (EMA) of the bit rate and packet rate for each IP address that it sees. If or when the EMA exceeds a certain user-defined threshold, then this IP address becomes a candidate for ID creation. If possible, a reverse DNS lookup may be used to determine the name. If successful, a name may be generated from its LDAP Owner field of the ManagedBy attribute and use the owner name instead of the DNS name. If unsuccessful, the name may be derived from its MAC address obtained via an SNMP query of the endpoint. Alternatively, the system user may declare that this area of the network is "static," in which case a name may be created using the IP address and a user-supplied suffix.

Profiling Crosspoints

Once the potential ID-base crosspoints have been generated, they preferably are written to a text file. Another process can periodically check this file and creates the ID crosspoints from it. This creation may be throttled to help prevent the system from being overwhelmed with simultaneous creation of large numbers of IDs.

To generate potential application-based crosspoints, the discovery process preferably checks the port of each virtual packet. If the port is a well-known port for a known application, or if it is a port that already has been assigned for a particular application, then traffic for that port can be accounted for in the bit rate and packet rate of the application. However, if the port is not already mapped to an application, then the discovery process can keep an EMA of the bit rate and packet rate for that port. If or when the EMA exceeds the user-defined threshold, then the port can be a candidate to become an application.

These ports that are potential applications can be written to a text file. Another process can periodically check this text file and displays these ports to the user. Users can either specify for these ports to become new application(s), or they can specify for them to join existing application(s), for example.

The location-based crosspoints can be specified by the system user in terms of subnet addresses to be included and/or ignored. The Interface-based crosspoints can be discovered interfaces associated with flow data. The time period-based crosspoints can be pre-specified as particular hours of a workday or non-workday.

Rate Profiling Metrics

Current network traffic for each crosspoint can be monitored using an exponential moving average (EMA). Several metrics for each profile point preferably are continually being updated based on this EMA. These metrics, which are occasionally baselined and saved as profiles, enable the system to understand "normal" behavior for this crosspoint. The current traffic EMA may then be compared with these baselined profiles at any time to determine whether the network behavior is normal.

Two metrics that may be stored for each profile point are the minimum and maximum for four different values: packet rate, bit rate, interaction rate, and burstiness.

The packet rate and bit rate values can be the EMA values updated periodically, such as once per second for example, using the average packet rate and average bit rate for that second.

Interaction rate is a measure of how many IP addresses are actively:
  sending to or receiving from an ID profile point;
  using an application (for an application profile point);
  sending to or receiving from a location profile point;
  sending to or receiving from an Interface profile point; or
  sending or receiving traffic during that time period (for a time period profile point).

Burstiness is the rate of change of bit rate. The literature discusses several commonly used measures of traffic burstiness:
  peak-to-mean ratio,
  coefficient of variation of inter-arrival times,
  the indices of dispersion for intervals and counts, and
  the Hurst parameter for self-similar distributions.

Using the peak-to-mean ratio can be an efficient metric to calculate realtime. It may be computed by taking the ratio of the peak of a very short-term rate to a long-term average rate; comparing, for example, the peak of a 1-second EMA (over a 5-minute interval) with a 5-minute EMA.

The minimum and maximum EMA values for these various metrics allow symptoms (or abnormalities) to be flagged that are higher than normal (hyper) or lower than normal (hypo).

Affinity Profiling Metrics

In addition to rate profiling metrics, each crosspoint has affinity profiling metrics. Affinity represents the strength of correspondence between the crosspoint and another specific entity (called an "affinity point"). The affinity metric can be bit rate, bit rate*pkt rate (in order to allow both factors to positively influence the metric), or something else.

For each type of crosspoint, here are some, but not necessarily all, of the potential types of affinity points:

IDs:
  Other IDs (which IDs does an ID communicate with),
  Applications (which Apps does an ID use),
  Locations (the ID belongs to which locations), and
  Time Periods (the ID communicates during which particular time periods(s) of the day).
Applications:
  IDs (which IDs are using this application),
  Locations (this application is being run to/from which locations),
  Interfaces (the Interfaces on which this application is delivered/consumed), and
  Time Periods (the application is being used during which particular time period(s) of the day).
Locations:
  IDs (which IDs are the most active at this location),
  Applications (which applications are being run from this location),
  Interfaces (the Interfaces which are associated with this location), and
  Time Periods (the location is handling traffic at which particular times of the day).
Interfaces:
  IDs (which IDs are the most active on this interface),
  Applications (which applications are being run most heavily on this interface),
  Locations (which locations are most active on this interface), and
  Time Periods (the interfaces are active on which particular time periods).
Time Periods:
  IDs (which IDs are the most active during this time period),
  Applications (which applications are being run most heavily during this time period),
  Interfaces (which interfaces are most active during this time period), and
  Locations (which locations are most active during this time period).

Affinity Profile Using Long Term EMA

For each profile point, train by tracking the metric's long-term EMA for each affinity point. (A long-term EMA is one where past data is weighted more heavily, and thus the metric is smoother over time compared with a normal EMA.) After some amount of training time, save several affinity points that have the top long-term averages and disregard the rest; this set becomes the "affinity profile."

When comparing the current state with the affinity profile, when the current state is abnormal can be identified compared with the affinity profile, plus determine whether it's a "hypo" or "hyper" symptom. By summing the squared differences between the affinity profile and the current traffic, a metric of the overall amount of difference can be determined, which then can be compared against a threshold to determine whether it's significant enough to be "abnormal." If it is, then by summing across these top affinity points for both the affinity profile and the current traffic, it may be determined whether it is hyper or hypo.

Affinity Profile Using Normal EMA

For each profile point, train by tracking the metric's normal EMA for each affinity point, saving the max and min values. After some amount of training time, save several affinity points that have the top EMA values and disregard the rest; this set becomes the affinity profile. To compare the current state with the affinity profile, compare each affinity point's current value one-by-one with the affinity profile. If it is greater than the max or less than the min, then it gets flagged as a difference. It then can be determined whether the overall difference across all profile points is significant enough to become a symptom event.

Symptom Detection Mechanism

Once the profile is in place, the detection mechanism can be determined by testing each crosspoint once per second using both the basic tests and the complex tests. If one of the tests signals an abnormality (i.e., the current EMA is significantly less than the minimum threshold, significantly more than the maximum threshold, or significantly different than the histogram), then a flag can be set for that profile point. If the crosspoint continues to experience the abnormality for a specified period, then it can be declared a "symptom event" and interested processes can be notified.

For a hyper abnormality, the detection mechanism attempts to determine further information about the excessive activity: where it's primarily coming from (for an incoming abnormality) or going to (for an outgoing abnormality), which protocol was primarily involved, and which port was primarily involved. We obtain this information by monitoring the IP addresses, ports, and protocols for all packets corresponding to a profile point involved in a hyper abnormality.

The predominant IP address can be determined by updating an EMA value for each matching IP address in an IP address tree as packets arrive. Tree nodes corresponding to IP addresses that don't receive packets will be aged, and eventually pruned from the tree if their EMA value gets small enough. Nodes with significant EMA values will stay on the tree. Periodically the EMA values from the tree get sorted, and the top IP address can be determined. If the top address has a significantly higher EMA than the other addresses, then it can be considered a predominant address and can be reported in the notification.

The port and protocol can be found in a similar manner, but use arrays rather than trees. The EMA values corresponding to different ports and protocols get continually updated as packets arrive; they also periodically get aged, and possibly can be purged if their EMA value is small enough. Periodically the arrays can be sorted, and the top port and protocol emerge. If they have a significantly higher EMA than the others, then they will be reported in the notification.

The symptom event will continue until the profile point experiences a specified period without any abnormalities. Once this occurs, the symptom event can be deemed over.

Accounting for Sampling During Profiling and Detecting

There are generally three areas where sampling can be used in profiling or detecting:

- The smoothing factor used during the calculations of the average packet inter-arrival time is typically 0.001, for example. However, if the sample rate is less than 1 in 5 (0.2), then the smoothing factor gets adjusted upward so that it is proportional to the inverse of the sampling rate. Otherwise, the smoothing factor may be too small and cause the EMA to rise too slowly due to the sampling and relatively low packet rates. If the sampling rate is really low (less than 1 in 5000), then the smoothing factor will be 1, which effectively means there is no smoothing.
- When checking for hypo symptoms, a fixed number of bits or packets can be added to the current rate, then the result can be compared against the corresponding profile. When the sampling rate is less than 1, this fixed number of bits or packets can be first multiplied by the sampling rate.
- Source or destination IP address tree pruning takes sampling into account so that nodes get pruned from the tree when their current EMA drops to less than the sampling rate. If there is an ongoing hyper symptom involving those nodes, then they won't be pruned until the symptom has expired.

Progressive Profiling

The profiling and detection mechanisms can operate in parallel. Periodically the profiling calculations can be updated as well as the detection calculations. If the detection mechanism indicates that an abnormality is present, then profiling can be temporarily stopped to avoid profiling on "bad" traffic patterns. As soon as the abnormality has ended, profiling resumes, beginning with the last saved good profile.

In order to declare an abnormality or symptom, the traffic levels may be a specified amount higher (than max), lower (than min), or different (than histograms). If the traffic levels are only slightly outside the previously observed ranges and not exceeding the specified amount, profiling continues without declaring an abnormality. This permits the profiles to adapt to naturally changing traffic environments. However, as soon as the differences are greater than the specified limit, profiling can be stopped and an abnormality can be declared.

After a specified amount of time has elapsed where the training profile for a crosspoint (known as the "emerging profile") has stabilized, the profile mechanism automatically updates the baseline profile used for detection (known as the "active profile"). It uses the emerging profile to update the active profile. This update calculation can be performed as an EMA calculation itself. The smoothing factor used for this profile update varies based on whether the emerging profile is trending higher or lower than the active profile. The upwards smoothing factor can be generally less than the downwards smoothing factor, allowing for quicker learning about new high traffic rates and slower "forgetting" about high traffic levels from the past.

Once the emerging profile has been used to update the active profile, the emerging profile cane be reset, and profile training can be restarted.

When a crosspoint is first created, its active profile is typically set to be accommodating: for example, its minimum threshold may be set to 0, its maximum may be set to a very high value, and its histogram bins may show a uniform distribution. This allows the crosspoint to initially see all of its traffic without initially declaring abnormalities.

The crosspoint's emerging profile is typically initialized in the opposite way: its maximum threshold may be set to 0 and its minimum threshold may be set to a very high value. As the crosspoint trains on traffic, this allows the maximum threshold to be able to decrease monotonically to its correct value, and the minimum threshold to be able to increase monotonically to its correct value. The histogram starts with a uniform distribution.

During the first auto-updating cycle, rather than using the exponential smoothing calculation, the active profile can be replaced with the emerging profile. Otherwise it could take a relatively long time for the active profile to converge to a reasonable set of values. For other auto-updating cycles, the EMA calculation may be used.

Retrospective Profiling

One possible alternative to progressive profiling is to profile based on historical data that is stored in the database, permitting additional analysis to be performed on the data during profiling, such as discarding a specified % of outliers. Possible steps for performing such "retrospective profiling" process include the following:

1. Obtain preferably all data from the database corresponding to the specified dates for the specified crosspoint. It can be helpful to independently analyze "working days" and "off days."

2. If certain time periods in the database don't contain any data, zero traffic can be assumed for those periods.
3. Any days that have symptoms preferably are ignored, unless the user specifically indicates that symptom data can be used for profiling.
4. The data is sorted.
5. If a specified percentage of outliers are to be discarded, those outliers are removed from the sorted dataset.
6. Profiles can be generated on the resulting data. These profiles can be max/min profiles, histogram profiles, or any other profile characterization.

Retrospective profiling preferably is done periodically (such as once a week) with the schedule being staggered for different measures of each crosspoint. Initially, there can be a blank current profile. When a new profile is computed, the new profile can replace the current profile (preferably instantly). Unlike progressive profiling, there is no notion of convergence of the emerging profile; rather, new profile when can be ready for immediate use as the current profile once computed.

Spectral Analysis of Crosspoint Historical Data

Referring to FIGS. 4 and 5, many crosspoints' traffic patterns may vary based on the time of day and/or the day of the week. From a profiling standpoint, this periodicity may be captured so that symptom detection is generally more effective. The spectral analysis technique analyzes the traffic behavior for a particular crosspoint and determines whether or not it shows daily or weekly periodicity. If so, then the profiling engine takes that into account and profile each day or day-of-week separately; if not, then there creation of separate profiles for different time intervals for that crosspoint may not be necessary.

Determining Crosspoint Periodicity

Figure 3:
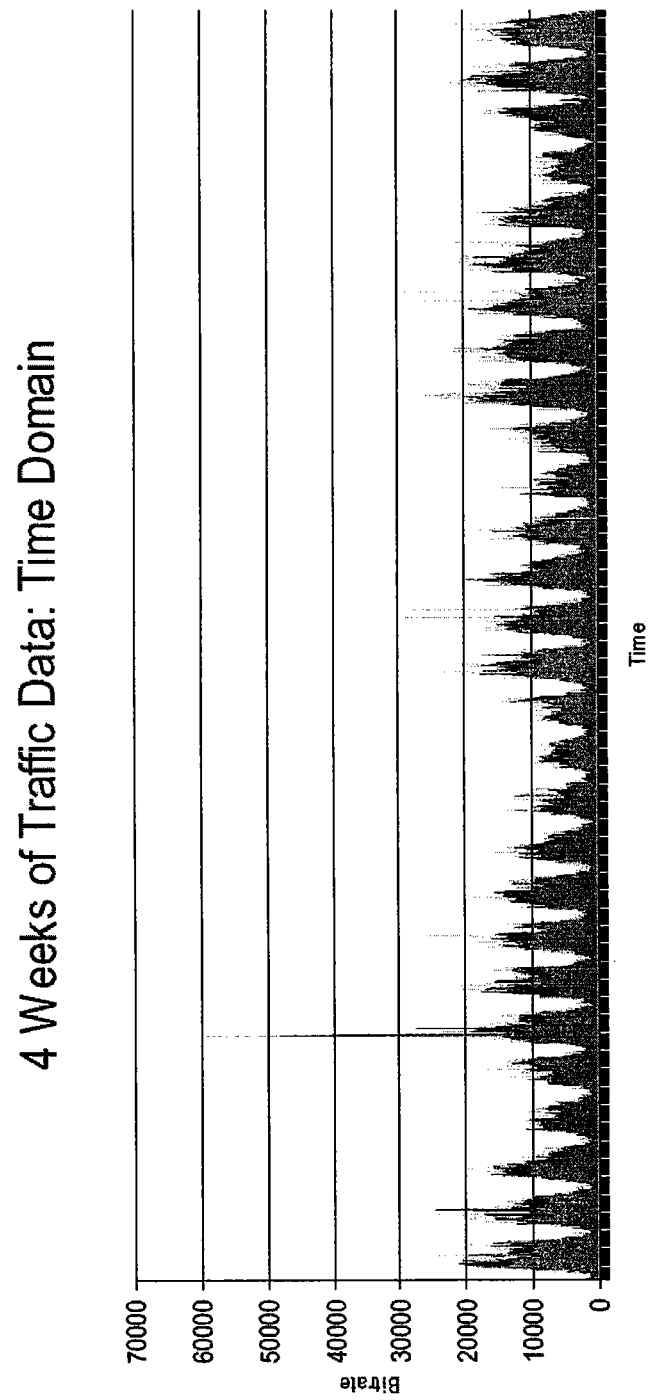
FIG. 3 shows accumulated traffic data.

One technique for determining crosspoint periodicity includes the following steps:

Retrieve (preferably) all bitrate data from the database for a particular crosspoint for the past several weeks (for example four may be used in order to trust patterns in the data). For an example, see FIG. 3.

Divide the total time period into evenly spaced bins, where the total number of bins are a power of 2. For example, running for 4 weeks with 8192 bins results in each bin having a size of 295.3125 seconds. For each bin, all bitrate datapoints whose timestamp falls into that bin can be averaged.

Run a Fast Fourier Transform (FFT) on this data set. The result of the FFT is a set of complex numbers corresponding to the coefficients of sine and cosine waves for different frequencies that could be added together to reconstruct the original set of datapoints.

Find the magnitude of each complex coefficient by taking the square root of the sum of squares of the real and imaginary terms.

Sort the magnitudes to determine which frequencies are dominant, and interpret the results.

The zero frequency term typically is the most dominant, corresponding to a constant term that allows the average traffic level to be positive. If the next most dominant term corresponds to a daily frequency (28 in the 4-week example) or a weekly frequency (4 in the 4-week example), then the traffic exhibits periodicity (See FIG. 4).

Another technique for determining crosspoint periodicity includes the following steps:

Retrieve (preferably) all bitrate data from the database for a particular crosspoint for the past several weeks (for example four may be used in order to trust patterns in the data). For an example, see FIG. 3.

Divide the total time period into evenly spaced bins, where the total number of bins are a power of 2. For example, running for 4 weeks with 8192 bins results in each bin having a size of 295.3125 seconds. For each bin, all bitrate datapoints whose timestamp falls into that bin can be averaged.

Run a series of pair-wise correlations among the various days' data. For each pair of days, first run a correlation where the times are properly aligned (e.g., 1 a.m. Monday correlating with 1 a.m. Tuesday). Then run correlations where the times are out of alignment by one hour (e.g., 1 a.m. Monday correlating with 2 a.m. Tuesday), then by two hours (e.g., 1 a.m. Monday correlating with 3 a.m. Tuesday, etc.), and so on.

Average the aligned correlations, then average the correlations representing a shift by 1 hour, then average the correlations representing a shift by 2 hours, and so on. This results in a set of 24 average correlation values.

Analyze these average correlation values. For the endpoint to be periodic, the average aligned correlation must be very high, and it must be significantly higher than the shifted average correlation data.

Profiling Periodic Crosspoints

If a crosspoint exhibits periodicity, then it can be profiled accordingly. For crosspoints with a dominant weekly periodicity, each time period can be independently profiled for a week.

For crosspoints with a dominant daily periodicity and a dominant weekly periodicity, each time period can be profiled for a week.

For crosspoints with a dominant daily periodicity but no dominant weekly term, each time period can be profiled for a day.

And for crosspoints without dominant daily or weekly periodicity terms, time-based profiling for a crosspoint is generally not done.

One technique for profiling a crosspoint the exhibits daily periodicity includes the following steps:

Run a Fast Fourier Transform (FFT) on the data set. The result of the FFT is a set of complex numbers corresponding to the coefficients of sine and cosine waves for different frequencies that could be added together to reconstruct the original set of datapoints.

Find the magnitude of each complex coefficient by taking the square root of the sum of squares of the real and imaginary terms.

Sort the magnitudes to determine which frequencies are dominant. Remove (preferably) all frequency terms except for the top few frequencies.

Run an inverse FFT on these remaining terms. The result is a smoothed version of the original time domain data set.

Bin the data into hourly increments, and determine the max and the min for each hour across all days. For example, find the max and min for the 0:00-1:00 hour across all days, then find the max and min for the 1:00-2:00 hour across all days, and so on. This results in a traffic envelope that varies hour-by-hour for a full day.

Determine how well the original database data fits within this envelope. If more than a specified outlier percentage of the original data falls outside the envelope, then slowly increase the envelope size until the specified outlier percentage is maintained.

The result should be a profile defined by max and min values, varying hour by hour, that has at most a specified outlier percentage.

Multidimensional Crosspoint Profiling

Combinations of four crosspoint types (IDs, Applications, Locations, and Time Periods) may also be profiled, thus gaining a finer crosspoint granularity for profiling and detection and may include the following combinations of two, three, or four crosspoint types:

- ID×Application: profile each application running on each endpoint
- ID×Location: profile each endpoint's behavior at each location
- ID×Interface: profile each endpoint's behavior at each interface
- ID×Time Period: profile each endpoint's behavior at various points in time
- Application×Location: profile each application running at each location
- Application×Interface: profile each application using each interface
- Application×Time Period: profile each application running at various points in time
- Location×Interface: profile each interface associated with each location
- Location×Time Period: profile traffic behavior at each location for various points in time
- Interface×Time Period: profile traffic behavior at each interface for various points in time
- ID×Application×Time Period: profile applications being run by each endpoint at various points in time
- ID×Location×Time Period: profile endpoints' traffic behavior at various locations for various points in time
- ID×Application×Location: profile applications being run by each endpoint at various locations
- ID×Application×Interface: profile applications being run by each endpoint at various interfaces
- ID×Location×Interface: profile endpoints' traffic behavior at various locations using various interfaces
- ID×Interface×Time Period: profile endpoints' traffic behavior using each interface at various points in time
- Application×Location×Time Period: profile applications being run at various locations for various points in time
- Application×Location×Interface: profile applications being run at various locations using each interface
- Application×Interface×Time Period: profile applications being run at each interface for various points in time
- Location×Interface×Time Period: profile each interface at each location for various points in time
- ID×Application×Location×Time Period: profile applications being run by each endpoint at various locations for various points in time
- ID×Application×Location×Interface: profile applications being run by each endpoint at various locations across various interfaces
- ID×Application×Interface×Time Period: profile applications being run by each endpoint across various interfaces at various points in time
- ID×Location×Interface×Time Period: profile endpoints' traffic behavior using each location for various interfaces at various points in time
- Application×Location×Interface×Time Period: profile applications being run from each location across various interfaces at various points in time
- ID×Application×Location×Interface×Time Period: profile applications being run by each endpoint from each location across various interfaces at various points in time.

For example, by profiling combinations of ID×Application, expected behavior may be determined, and symptoms flagged at a finer granularity. This in turn may allow the correlation engine to more easily hone in on the problem.

Note that each crosspoint may have several measures associated with it including the rate measures of packet rate, bit rate, burstiness, and interaction rate (with other crosspoints) as well as an affinity measure with other crosspoints.

Note that Time Period may not be applicable if the Spectral Analysis results indicate that the crosspoint is not dependent upon time. In those cases, the combinations would typically not be profiled.

Histogram-Based Representation

The profiling and detection engines can utilize histograms to augment the minimum/maximum thresholds. These histograms preferably are calculated for the same metrics as the thresholds: bitrate, packetrate, burstiness, and interaction rate. The histograms may be constructed as follows:

- The overall potential range of each traffic metric may be pre-determined based on the metric. This overall range can then be segmented into several smaller bins for the histogram. The bins can be constructed with a log scale so that the lower bins have finer granularity, and the higher bins have coarser granularity. The highest bin typically includes all data points greater than some value; the lowest bin typically has a lower bound of 0.
- Each bin holds its ongoing EMA statistics (which get updated periodically, say every N minutes), plus its count for the current period.
- At the end of a time period such as every second, the counts can be updated for the past interval. Each metric falls into a particular bin, so the count for that bin can be incremented.
- At the end of N minutes, for example, there will be N×60 data points collected into the histogram bins (for a time period of one second). The relative frequency can be calculated for each bin for those N×60 points.
- Those relative frequencies can then be used to perform an EMA calculation to update the EMA statistics for each histogram bin.

Each bin thus has its own EMA calculations, providing ongoing relative frequencies for each metric. The result can be a histogram reflecting the distribution of the metrics over time.

Symptom Detection Using Distribution-Based Probability Analysis

As with the minimum and maximum thresholds, the profiling and detection engines may maintain two sets of histograms for each crosspoint: one for training (the "emerging profile") and one for detecting (the "active profile"), for example.

The active profile's histograms may be used for detection as follows.

- As described previously, the overall range for each traffic metric can be segmented into several smaller bins. Each bin holds its EMA statistics, which get updated every N minutes, plus its counts for the current period. Counts can be incremented every second based on the metric value during the past one second interval, for example.
- At the end of N minutes, we calculate the relative frequency for each bin for the N×60 data points. Before using this relative frequency to update the EMA statistics for each bin, these relative frequencies and the baselined active profile histogram can be compared.
- The deviation of the current relative frequency from the active threshold can be calculated using the sum of squared differences across all bins. When this deviation is greater than a pre-determined threshold for a pre-determined number of periods, then a symptom can be declared.

Once a symptom is declared, the detection engine preferably determines the type of symptom. The symptom could be:

Hyper: the current relative frequency for the higher bins is greater than those of the higher bins for the active threshold;

Hypo: the current relative frequency for the lower bins is greater than those of the lower bins for the active threshold; or Sundry: there is no dominant hyper or hypo trend, but there still is a significant deviation in the distribution.

Alternative Embodiments

After reading this application, those skilled in the art will recognize that the invention has wide applicability, and is not limited to the embodiments described herein.

We claim:

1. A network monitoring method, including steps of
receiving, at a flow processing engine, flow monitoring information, said flow monitoring information including information describing source addresses and destination addresses for each identified flow, said flow monitoring information indicating an actual behavior for each identified flow, including a start time and an end time for said flow;
generating a set of virtual packets for each flow in response to said flow monitoring information, said virtual packets being equally distributed over a nonzero duration including said start time and said end time for said flow and representing at least some of said flow monitoring information;
maintaining a data structure including flow monitoring information for each source address and destination address pair, that data structure including a root and a set of child nodes, each child node indicating its logical distance from that root, each child node being either a leaf or an intermediate node having at least two child nodes itself, each leaf including flow monitoring information relating to an address describing its position in that data structure, that address being either a source address for a flow or a destination address for a flow;
said data structure defining one or more omitted nodes between said root and said child nodes, omitted nodes including those intermediate leaf nodes that have only one child node with data;
processing that flow monitoring information using a set of reentrant concurrent threads; and
pruning that data structure from time to time, with the effect of that data structure being limited in size;
said steps of pruning including steps of
determining an amount of pruning that can be accomplished in a $1^{st}$ specific limited time;
when said amount accomplished is sufficient, stopping pruning until a later time; and
when said amount accomplished is not sufficient, continuing pruning for a $2^{nd}$ specific limited time.

2. A method as in claim 1, wherein
said virtual packets are responsive to a number of flow packets and a flow duration, determinable from said flow monitoring information, said virtual packets including an equal number of packets as said flow packets and an equal duration as said flow duration.

3. A method as in claim 1, wherein
said virtual packets include no payload information.

4. A method as in claim 1, wherein
said data structure includes, at each leaf node, a reference to a previous leaf node, and a reference to a later leaf node;
whereby said data structure can be traversed from a $1^{st}$ leaf node to a $2^{nd}$ leaf node without traversal of a common parent node for said $1^{st}$ leaf node and said $2^{nd}$ leaf node.

5. One or more processor readable storage devices having processor readable code embodied on the processor readable storage devices, said processor readable code for programming one or more processors to perform a method including steps of:
receiving flow information including information describing source addresses and destination addresses for each identified flow, said flow information indicating an actual behavior for each identified flow, including a start time and an end time for said flow;
generating a set of virtual packets for each flow in response to said flow information, said virtual packets being equally distributed over a nonzero duration including said start time and said end time for said flow;
maintaining a data structure including flow information for each source address and destination address pair, that data structure including a root and a set of child nodes, each child node indicating its logical distance from that root, each child node being either a leaf or an intermediate node having at least two child nodes itself, each leaf including information relating to an address describing its position in that data structure, that address being either a source address for a flow or a destination address for a flow;
said data structure defining one or more omitted nodes between said root and said child nodes, omitted nodes including those intermediate leaf nodes that have only one child node with data; and
processing that flow information using a set of reentrant concurrent threads; and
pruning that data structure from time to time, with the effect of that data structure being limited in size;
said steps of pruning including steps of
determining an amount of pruning that can be accomplished in a 1st specific limited time;
when said amount accomplished is sufficient, stopping pruning until a later time; and
when said amount accomplished is not sufficient, continuing pruning for a $2^{nd}$ specific limited time.

6. A method as in claim 1, wherein
said flow monitoring information is responsive to a completion of said flow.

7. A method as in claim 1, wherein
said steps of generating a set of virtual packets for each flow are responsive to a completion of said each flow.

8. A method as in claim 1, wherein
said $2^{nd}$ specific limited time differs from said $1^{st}$ specific limited time.

9. A network monitoring method, including steps of
receiving, at a flow processing engine, flow monitoring information, said flow monitoring information including information describing source addresses and destination addresses for each identified flow, said flow monitoring information indicating an actual behavior for each identified flow, including a start time and an end time for said flow;
generating a set of virtual packets for each flow in response to said flow monitoring information, said virtual packets being equally distributed over a nonzero duration including said start time and said end time for said flow and representing at least some of said flow monitoring information;

maintaining a data structure including flow monitoring information for each source address and destination address pair, that data structure including a root and a set of child nodes, each child node indicating its logical distance from that root, each child node being either a leaf or an intermediate node having at least two child nodes itself, each leaf including flow monitoring information relating to an address describing its position in that data structure, that address being either a source address for a flow or a destination address for a flow;

said data structure defining one or more omitted nodes between said root and said child nodes, omitted nodes including those intermediate leaf nodes that have only one child node with data;

processing that flow monitoring information using a set of reentrant concurrent threads; and pruning that data structure from time to time, with the effect of that data structure being limited in size;

said steps of pruning including steps of limiting a time duration for those steps of pruning to a specified limited time;

setting a marker to indicate where those steps of pruning were only partially completed at an end of that time duration; and resuming those steps of pruning at a later time beginning at that marker.

10. A method as in claim 9, wherein
said virtual packets are responsive to a number of flow packets and a flow duration, determinable from said flow monitoring information, said virtual packets including an equal number of packets as said flow packets and an equal duration as said flow duration.

11. A method as in claim 9, wherein
said virtual packets include no payload information.

12. A method as in claim 9, wherein
said data structure includes, at each leaf node, a reference to a previous leaf node, and a reference to a later leaf node;
whereby said data structure can be traversed from a $1^{st}$ leaf node to a $2^{nd}$ leaf node without traversal of a common parent node for said $1^{st}$ leaf node and said $2^{nd}$ leaf node.

13. A method as in claim 9, wherein
said data structure includes, at each leaf node, a reference to a previous leaf node, and a reference to a later leaf node;
whereby said data structure can be traversed from a $1^{st}$ leaf node to a $2^{nd}$ leaf node without traversal of a common parent node for said $1^{st}$ leaf node and said $2^{nd}$ leaf node.

14. A method as in claim 9, wherein
said flow monitoring information is responsive to a completion of said flow.

15. A method as in claim 9, wherein
said steps of generating a set of virtual packets for each flow are responsive to a completion of said each flow.

16. A system comprising:
a flow processor disposed to receive flow monitoring information, said flow monitoring information including source addresses and destination addresses for each identified flow, said flow monitoring information indicating an actual behavior for each identified flow, including a start time and an end time for said flow;
a virtual packet generator, said virtual packet generator disposed to generate a set of virtual packets for each flow in response to said flow monitoring information, said virtual packets being equally distributed over a nonzero duration including said start time and said end time for said flow and representing at least some of said flow monitoring information;

a memory coupled to the flow processor, the memory including a data structure, that data structure including a root and a set of child nodes, each child node indicating its logical distance from that root, each child node being either a leaf or an intermediate node having at least two child nodes itself, each leaf including flow monitoring information relating to an address describing its position in that data structure, that address being either a source address for a flow or a destination address for a flow;

said data structure defining one or more omitted nodes between said root and said child nodes, omitted nodes including those intermediate leaf nodes that have only one child node with data;

wherein said memory includes instructions interpretable by a computing device to perform a method of:

pruning that data structure from time to time, with the effect of that data structure being limited in size;

said steps of pruning including steps of determining an amount of pruning that can be accomplished in a $1^{st}$ specific limited time;

when said amount accomplished is sufficient, stopping pruning until a later time; and when said amount accomplished is not sufficient, continuing pruning for a $2^{nd}$ specific limited time.

17. The system of claim 16 further comprising:
a virtual bus coupled to the flow processor through either a discovery engine, a monitoring engine, a profiling engine or a the detection engine.

18. A system as in claim 16, wherein
said flow monitoring information is responsive to a completion of said flow.

19. A system as in claim 16, wherein
said virtual packet generator is responsive to a completion of said each flow.

20. A device as in claim 5, wherein
said data structure includes, at each leaf node, a reference to a previous leaf node, and a reference to a later leaf node;
whereby said data structure can be traversed from a $1^{st}$ leaf node to a $2^{nd}$ leaf node without traversal of a common parent node for said $1^{st}$ leaf node and said $2^{nd}$ leaf node.

21. A device as in claim 5, wherein
said virtual packets are responsive to a number of flow packets and a flow duration, determinable from said flow information, said virtual packets including an equal number of packets as said flow packets and an equal duration as said flow duration.

22. A device as in claim 5, wherein
said virtual packets include no payload information.

23. A device as in claim 5, wherein
said flow monitoring information is responsive to a completion of said flow.

24. A device as in claim 5, wherein
said steps of generating a set of virtual packets for each flow are responsive to a completion of said each flow.

25. A device as in claim 5, wherein
said $2^{nd}$ specific limited time differs from said $1^{st}$ specific limited time.

26. One or more processor readable storage devices having processor readable code embodied on the processor readable storage devices, said processor readable code for programming one or more processors to perform a method including steps of:

receiving flow information including information describing source addresses and destination addresses for each identified flow, said flow information indicating an actual behavior for each identified flow, including a start time and an end time for said flow;

generating a set of virtual packets for each flow in response to said flow information, said virtual packets being equally distributed over a nonzero duration including said start time and said end time for said flow;

maintaining a data structure including flow information for each source address and destination address pair, that data structure including a root and a set of child nodes, each child node indicating its logical distance from that root, each child node being either a leaf or an intermediate node having at least two child nodes itself, each leaf including information relating to an address describing its position in that data structure, that address being either a source address for a flow or a destination address for a flow;

said data structure defining one or more omitted nodes between said root and said child nodes, omitted nodes including those intermediate leaf nodes that have only one child node with data; and processing that flow information using a set of reentrant concurrent threads;

pruning that data structure from time to time, with the effect of that data structure being limited in size;

said steps of pruning including steps of limiting a time duration for those steps of pruning to a specified limited time;

setting a marker to indicate where those steps of pruning were only partially completed at an end of that time duration; and resuming those steps of pruning at a later time beginning at that marker.

27. A device as in claim 26, wherein
said virtual packets are responsive to a number of flow packets and a flow duration, determinable from said flow information, said virtual packets including an equal number of packets as said flow packets and an equal duration as said flow duration.

28. A device as in claim 26, wherein
said virtual packets include no payload information.

29. A device as in claim 26, wherein
said flow monitoring information is responsive to a completion of said flow.

30. A device as in claim 26, wherein
said steps of generating a set of virtual packets for each flow are responsive to a completion of said each flow.

31. A device as in claim 26, wherein
said $2^{nd}$ specific limited time differs from said $1^{st}$ specific limited time.

32. A system comprising:
a flow processor disposed to receive flow monitoring information, said flow monitoring information including source addresses and destination addresses for each identified flow, said flow monitoring information indicating an actual behavior for each identified flow, including a start time and an end time for said flow;

a virtual packet generator, said virtual packet generator disposed to generate a set of virtual packets for each flow in response to said flow monitoring information, said virtual packets being equally distributed over a nonzero duration including said start time and said end time for said flow and representing at least some of said flow monitoring information;

a memory coupled to the flow processor, the memory including a data structure, that data structure including a root and a set of child nodes, each child node indicating its logical distance from that root, each child node being either a leaf or an intermediate node having at least two child nodes itself, each leaf including flow monitoring information relating to an address describing its position in that data structure, that address being either a source address for a flow or a destination address for a flow;

said data structure defining one or more omitted nodes between said root and said child nodes, omitted nodes including those intermediate leaf nodes that have only one child node with data;

wherein said memory includes instructions interpretable by a computing device to perform a method of:

pruning that data structure from time to time, with the effect of that data structure being limited in size;

said steps of pruning including steps of limiting a time duration for those steps of pruning to a specified limited time;

setting a marker to indicate where those steps of pruning were only partially completed at an end of that time duration; and resuming those steps of pruning at a later time beginning at that marker.

33. The system of claim 32 further comprising:
a virtual bus coupled to the flow processor through either a discovery engine, a monitoring engine, a profiling engine or a the detection engine.

* * * * *